Patented Dec. 16, 1930

1,785,601

UNITED STATES PATENT OFFICE

ARNOLD SHEPHERDSON AND SIDNEY THORNLEY, OF BLACKLEY, MANCHESTER, ENGLAND, ASSIGNORS TO BRITISH DYESTUFFS CORPORATION LIMITED, OF MANCHESTER, ENGLAND

MANUFACTURE OF PYRANTHRONE DERIVATIVES

No Drawing. Original application filed September 29, 1927, Serial No. 222,932, and in Great Britain October 8, 1926. Divided and this application filed May 9, 1929. Serial No. 361,844.

In a copending application Ser. No. 217,540 filed by one of us, Sidney Thornley, on May 21, 1927, which matured into Patent No. 1,662,872 on March 20, 1928, there is disclosed the manufacture of new vat dyestuffs from flavanthrone. That application discloses a process of reacting upon flavanthrone with hydroxyl amine or salts thereof, to form an amino derivative of flavanthrone and then subsequently acylating the amino derivative thus formed by reacting the same with an acylating agent to produce an acyl-amino-flavanthrone. These acyl-amino-flavanthrones dye cotton in brown shades in an advantageous manner.

In our copending application Ser. No. 222,932 of which the present application is a division, we describe the manufacture of other new and useful vat dyestuffs of a different type which may be made from certain pyranthrone compounds by a somewhat similar procedure. Our invention as disclosed in our copending application Ser. No. 222,932, relates to the production of new vat dyestuffs from pyranthrone compounds of the class consisting of pyranthrone and halogenated pyranthrone; and it comprises a process wherein such pyranthrone compounds are reacted upon with hydroxyl amine to form amino derivatives of the same, the said amino derivatives being subsequently reacted with an acylating agent to convert them into corresponding acyl-amino compounds; and it further comprises as new dyestuffs the amino and acyl amino compounds thus produced.

The parent application Ser. No. 222,932 is mainly directed to amino pyranthrones and the process of making the same. Our present application is mainly directed to the acyl-amino compounds and the process of making these compounds.

In making the amino derivatives, we have found that the reaction between the pyranthrone compound and the hydroxyl amine may be advantageously carried out in the presence of sulphuric acid. Also the presence of ferrous sulphate during such reaction is advantageous.

By our process, pyranthrone is easily converted into new and useful vat dyestuffs. The halogenated pyranthrones, for instance, chloro or bromo pyranthrone, are likewise converted into similar dyestuffs equally as valuable.

The amino compounds are useful both as dyestuffs and as intermediates. They dye cotton from an alkaline hydrosulphite vat in deep brown shades. Again they may serve as intermediates and be themselves converted into other dyestuffs. When treated with an acylating agent for instance, benzoyl chloride, acetyl chloride, etc., they are converted into the corresponding acyl derivatives. These acyl compounds also give various brown shades. When a benzoyl group has been introduced into the compound a reddish brown shade is obtained on cotton.

We have indicated the broad scope of our invention. Our process is capable of various modifications. The time, temperature and such details may be varied within certain limits. The following examples are typical embodiments of our invention and illustrate it without limiting the scope thereof. In these examples the parts are by weight.

*Example 1.*—20 parts of pyranthrone are dissolved in 400 parts of sulphuric acid, 66° Bé., by stirring at 60° C. The solution is cooled, 24 parts of ferrous sulphate crystals added, followed, after again cooling, by the gradual addition of 10 parts of hydroxylamine hydrochloride. The temperature is raised to 165° C. and maintained at 160–165° C,. with stirring, for 2 hours. The reaction mixture is cooled, poured into 3,000 parts of water and the whole stirred. After separation by filtration, the residue is washed with water until free from acid, and dried. The substance dyes cotton from a hydrosulphite vat in deep brown shades. Treatment of the dyed fibre with cold sodium hypochlorite solution (¼° Tw.) causes a considerable change in the shade.

The product of Example 1 is probably an aminated pyranthrone containing up to three amino groups and represented by the formula

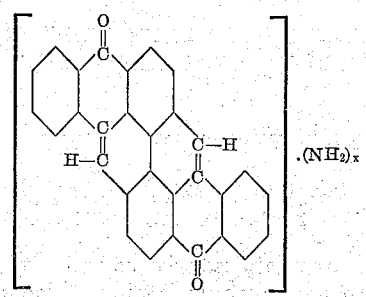

in which $x$ is an integer probably less than 4. The vat dyes produced by the present process are dark coloured substances, insoluble in water but slightly soluble in organic solvents.

A similar product is obtained when the reaction is carried out in the absence of ferrous sulphate.

*Example 2.*—10 parts of the dried product of Example 1, 150 parts of nitrobenzene, and 36 parts of benzoyl chloride are heated with stirring at 170° C. for 1¾ hours. Afterwards, the temperature is raised to 210° C. and maintained at 205–210° C. for 2 hours. The reaction mixture is cooled, 280 parts methylated spirits added, stirred for an hour, and filtered. The residue is washed with denaturated alcohol of the type of methylated spirits until free from nitrobenzene and is then boiled with 200 parts of water containing 25 parts of sodium hypochlorite (15 per cent available chlorine) for 30 minutes. This treatment is followed by the addition of 10 parts of glacial acetic acid and a further heating for 15 minutes at a boiling temperature. After separation by filtration, the residue is well washed with water and dried. The product is a dark brown substance, slightly soluble in hot nitrobenzene or aniline giving orange brown solutions, insoluble in water, soluble in concentrated sulphuric acid to a blue solution which reddens when heated with a little boric acid. The product is hydrolyzed by the heating with 80 per cent sulphuric acid giving an aminated pyranthrone and benzoic acid. The compound gives a reddish violet vat with alkaline hydrosulphite, from which cotton is dyed reddish brown. The shade is fast to chlorine.

The formula of the benzoylated derivative is probably

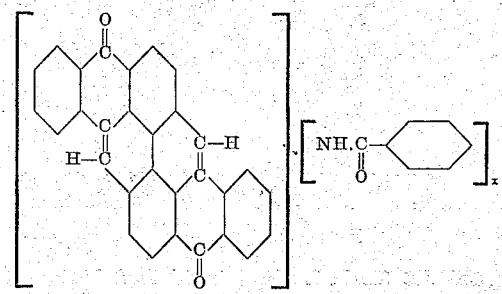

wherein $x$ is an integer probably less than 4.

In place of the benzoyl chloride in this example, we may use other acylating agents such as acetic anhydride, acetyl chloride, oxalyl chloride, anisoyl chloride, etc. By this means various shades of brown may be obtained.

The vat dyestuffs produced by this acylating process are dark coloured substances, insoluble in water but slightly soluble in organic solvents. They are hydrolyzed by heating with 80 per cent sulphuric acid, giving amidated pyranthrones and carboxylic acid, R.COOH. These acylated vat dyestuffs may be represented by the probable formula

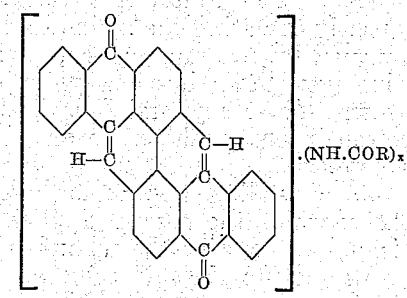

wherein $x$ is an integer probably less than 4 and COR represents an acyl radical.

What we claim and desire to secure by Letters Patent is—

1. The vat dyes of probable general formula

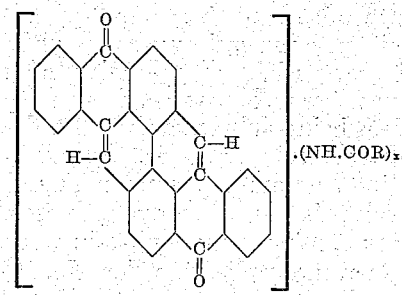

in which .CO.R is an acyl radical and $x$ is an integer less than four, the said vat dyes being dark coloured substances insoluble in water and little soluble in organic solvents, dyeing cotton in brown shades from a hydrosulphite vat, and being hydrolyzed by heating with 80 per cent sulphuric acid to an aminated pyranthrone and a carboxylic acid, R.COOH.

2. The vat dye of probable formula

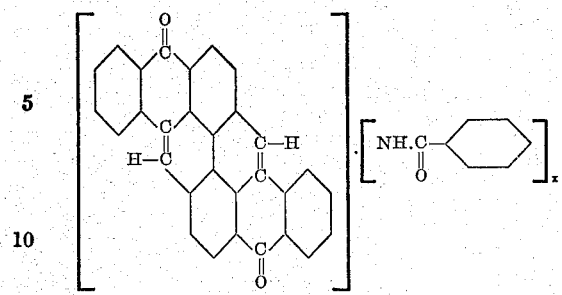

in which $x$ is an integer less than four, the said vat dye being a dark brown substance, slightly soluble in hot nitrobenzene or aniline to orange brown solutions, insoluble in water, soluble with a blue coloration in concentrated sulphuric acid, the colour becoming redder when the solution is warmed with a little boric acid, dyeing cotton reddish brown from a reddish violet hydrosulphite vat, and being hydrolyzed by hot 80 per cent sulphuric acid with production of an aminated pyranthrone and benzoic acid.

3. In the manufacture of acylated vat dyestuffs from amidated pyranthrone compounds of the class consisting of pyranthrone and halogenated pyranthrones, the process which comprises reacting an acylating agent with an amino pyranthrone compound containing less than four amino groups, to convert the said amino pyranthrone compound into the corresponding acyl amino compound, the said amino pyranthrone compound being obtainable by condensing hydroxyl amine hydrochloride with a pyranthrone compound of the class consisting of pyranthrone and halogenated pyranthrone.

4. In the manufacture of benzoylated vat dyestuffs from amino pyranthrone compounds of the class consisting of pyranthrone and halogenated pyranthrones, the process which comprises reacting a benzoylating agent with an amino pyranthrone compound containing less than four amino groups to convert the said amino compound into the corresponding benzoylated amino compound, the said amino pyranthrone being obtainable by condensing hydroxyl amine hydrochloride with a pyranthrone compound of the class consisting of pyranthrone and halogenated pyranthrones.

5. In the manufacture of acylated vat dyestuffs from amino pyranthrone compounds of the class consisting of pyranthrone and halogenated pyranthrones, the process which comprises reacting an acylating agent having the probable formula

wherein

represents an acyl group with an amino pyranthrone compound having the probable formula

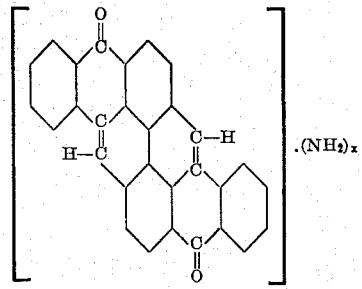

wherein $x$ represents an integer probably less than 4, to convert the said amino pyranthrone into an acyl amino compound having the probable formula

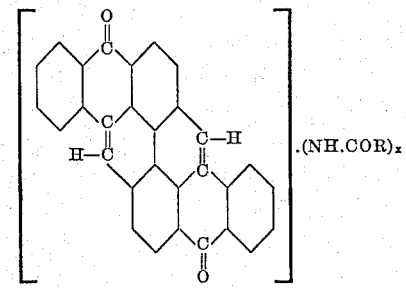

wherein $x$ represents an integer probably less than 4 and $-COR$ represents an acyl group.

6. In the manufacture of benzoylated vat dyestuffs from amino pyranthrones, the process which comprises reacting benzoyl chloride with an amino pyranthrone compound having the probable formula

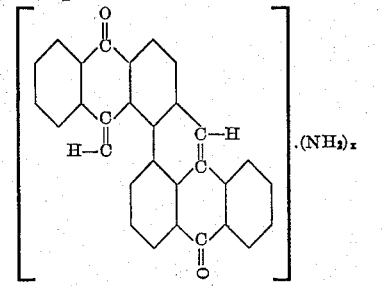

wherein $x$ is an integer probably less than 4, to convert the said amino pyranthrone into a benzoylated amino compound having the probable formula

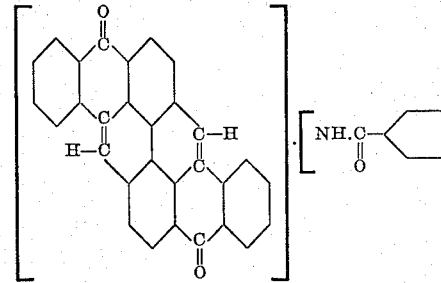

wherein $x$ represents an integer probably less than 4.

In witness whereof we affix our signatures.
ARNOLD SHEPHERDSON.
SIDNEY THORNLEY.